No. 879,852. PATENTED FEB. 25, 1908.
A. W. COPLAND.
DOUGH FEEDING DEVICE.
APPLICATION FILED JAN. 31, 1902.
7 SHEETS—SHEET 1.
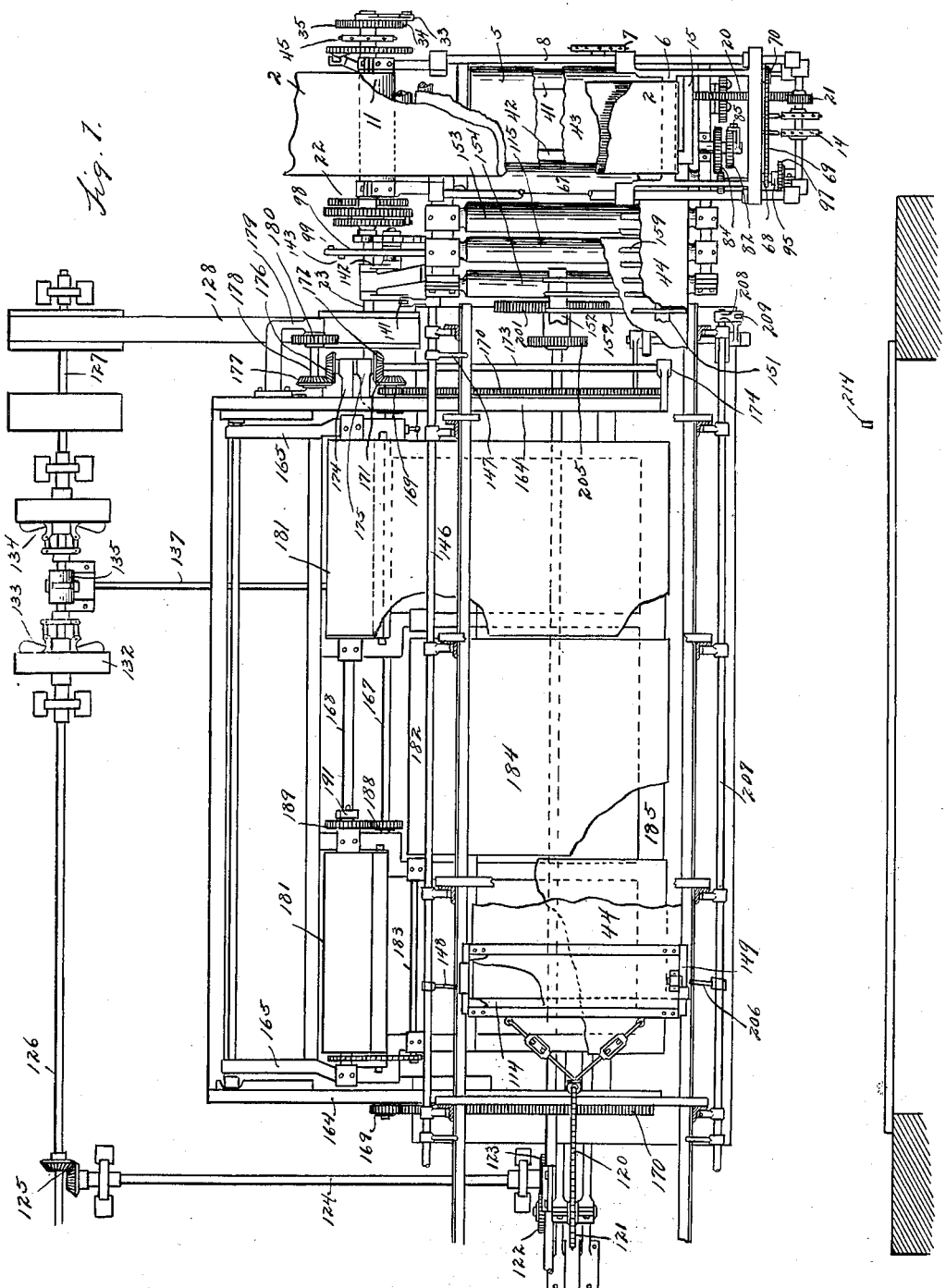
WITNESSES
INVENTOR
By
Attorneys.

No. 879,852. PATENTED FEB. 25, 1908.
A. W. COPLAND.
DOUGH FEEDING DEVICE.
APPLICATION FILED JAN. 31, 1902.
7 SHEETS—SHEET 2.
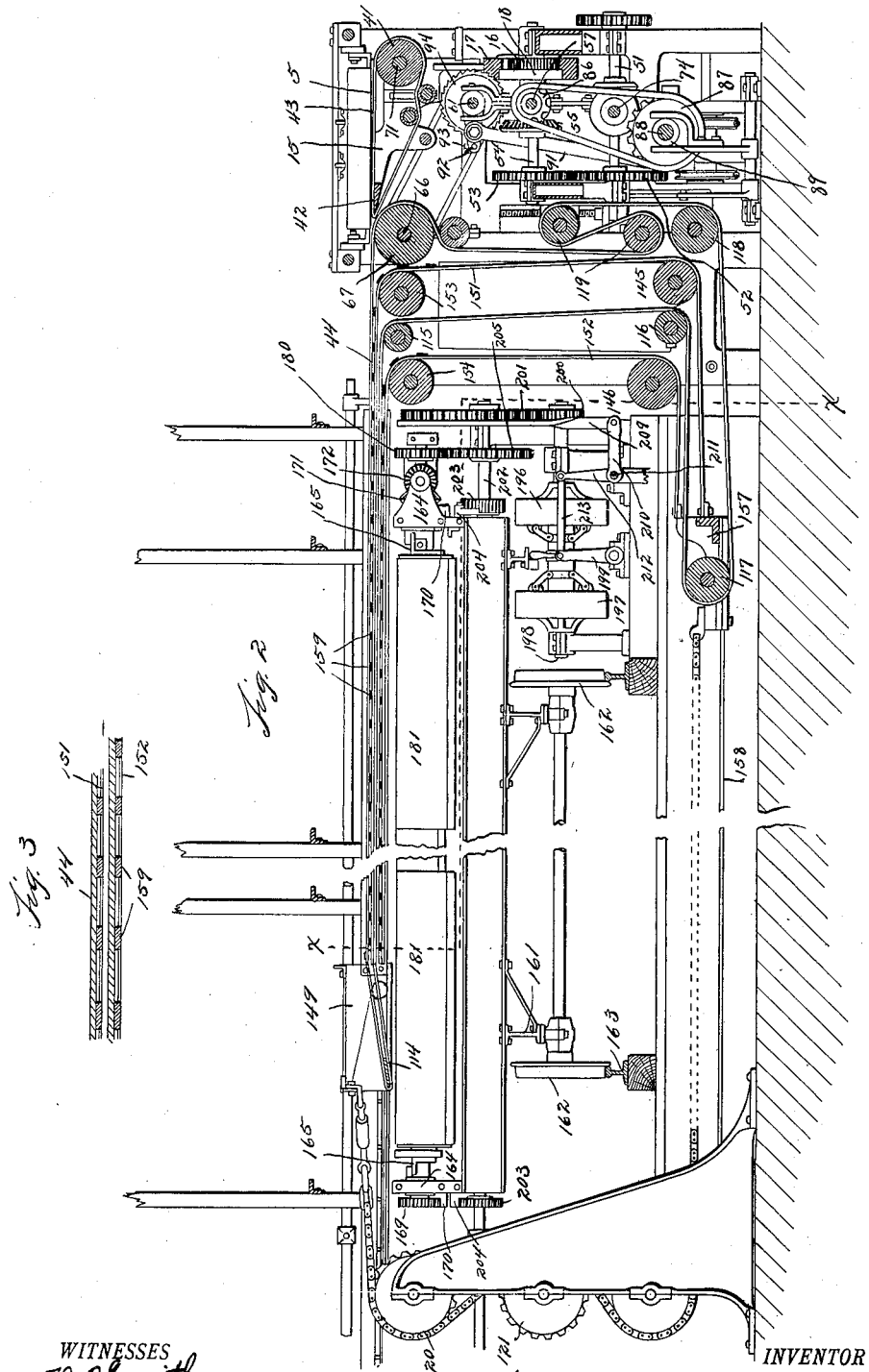
WITNESSES
INVENTOR
Alexander W. Copland
By
Attorneys.

No. 879,852. PATENTED FEB. 25, 1908.
A. W. COPLAND.
DOUGH FEEDING DEVICE.
APPLICATION FILED JAN. 31, 1902.
7 SHEETS—SHEET 3.
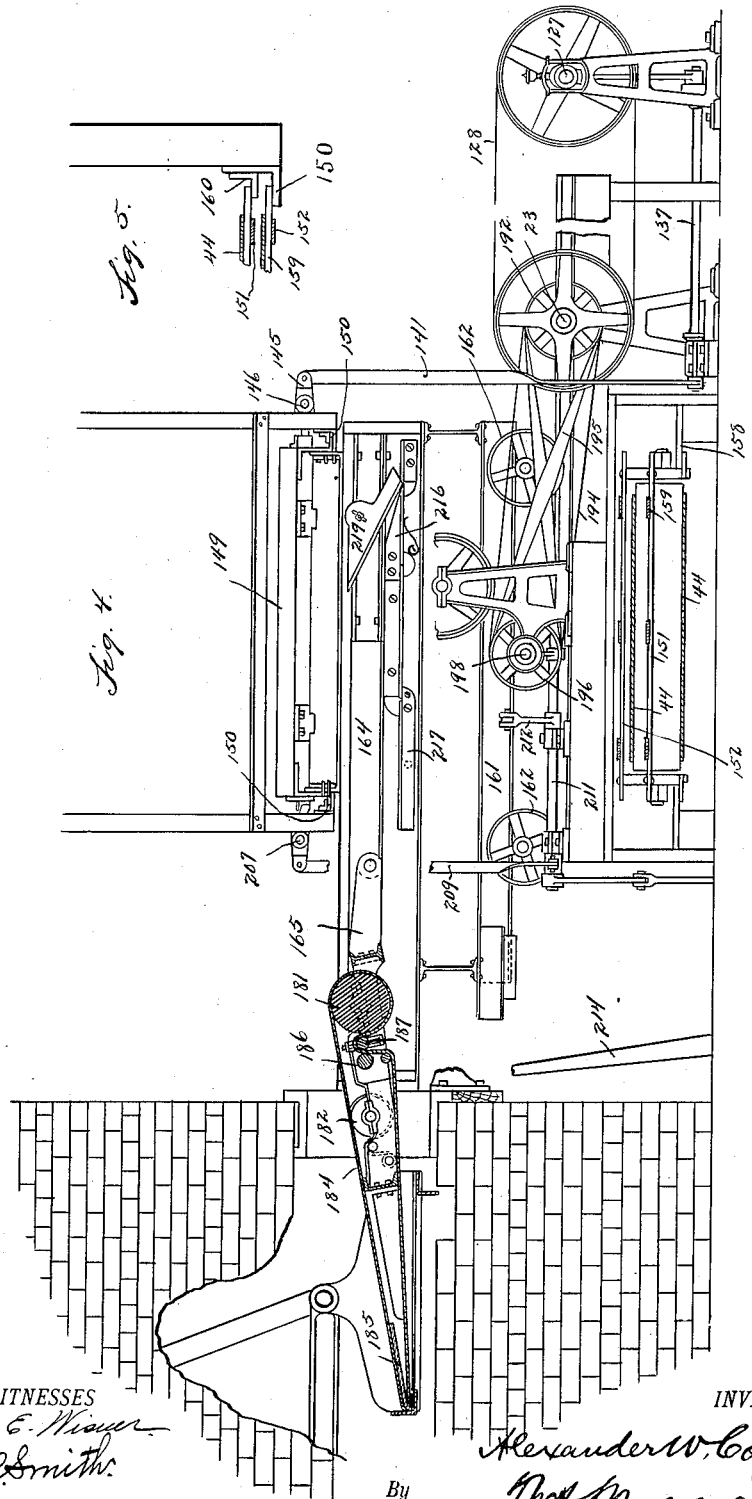
WITNESSES
INVENTOR
Alexander W. Copland
By
Attorneys.

No. 879,852. PATENTED FEB. 25, 1908.
A. W. COPLAND.
DOUGH FEEDING DEVICE.
APPLICATION FILED JAN. 31, 1902.
7 SHEETS—SHEET 4.
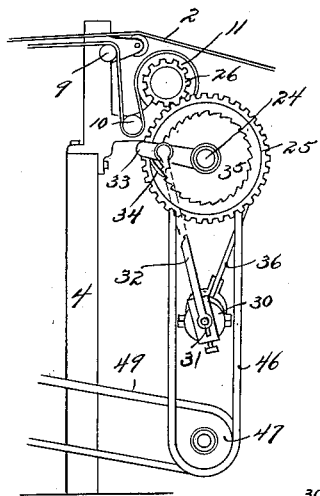
Fig. 7.
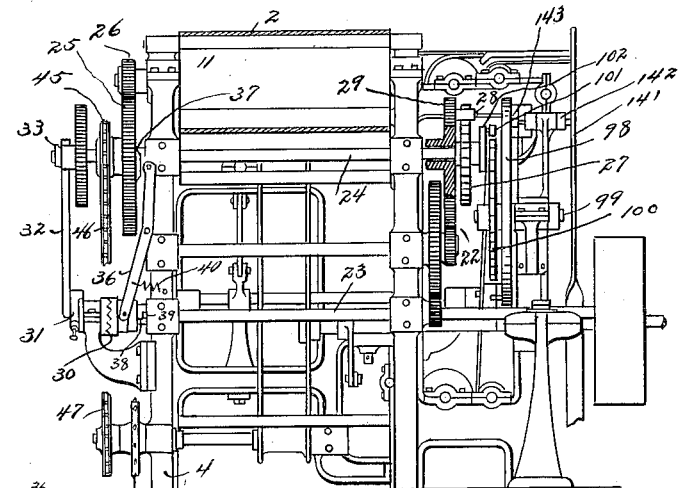
Fig. 6.
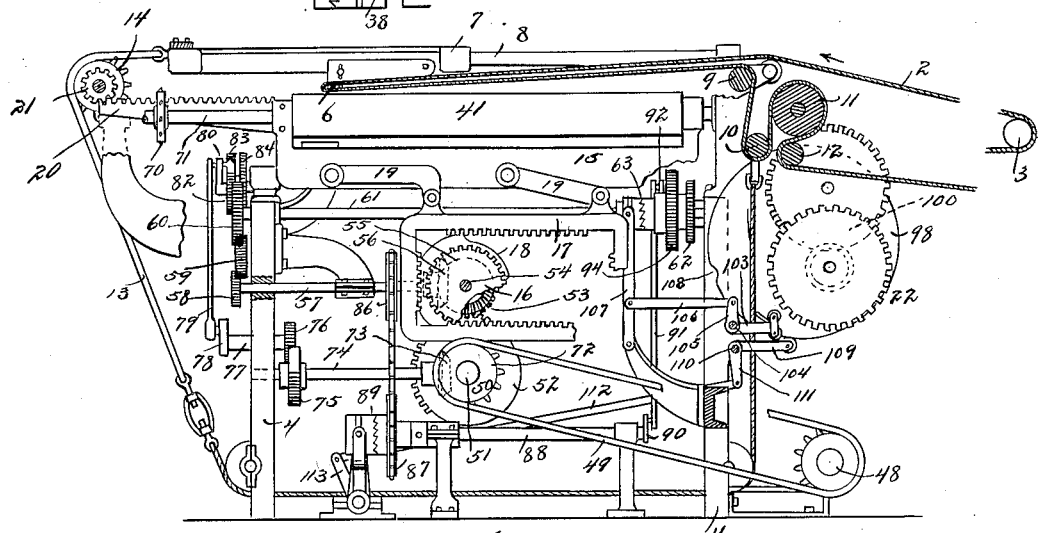
Fig. 14.
Fig. 8.
WITNESSES
Chas. E. Wiener.
H. C. Smith.
INVENTOR
Alexander W. Copland
By Thos. S. Spragne & Son
Attorneys.

No. 879,852. PATENTED FEB. 25, 1908.
A. W. COPLAND.
DOUGH FEEDING DEVICE.
APPLICATION FILED JAN. 31, 1902.
7 SHEETS—SHEET 5.
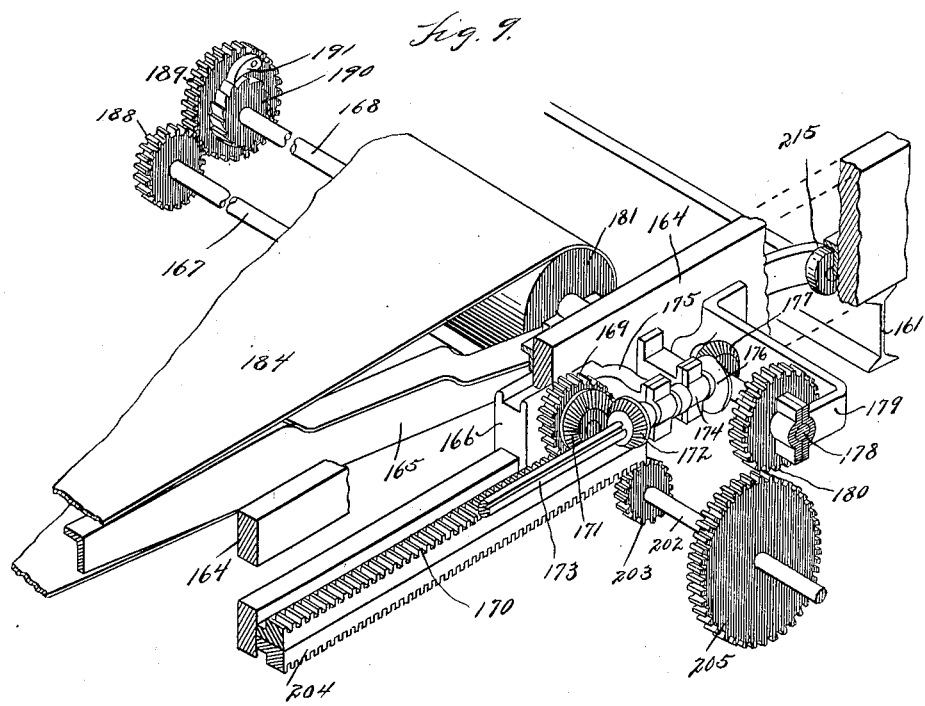
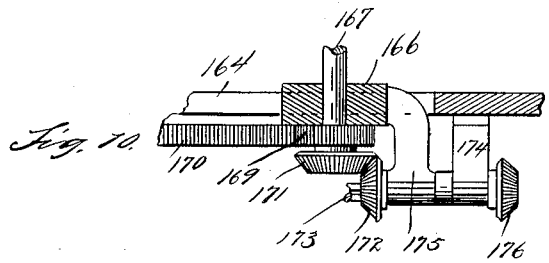
WITNESSES
INVENTOR
Alexander W Copland
By
Attorneys.

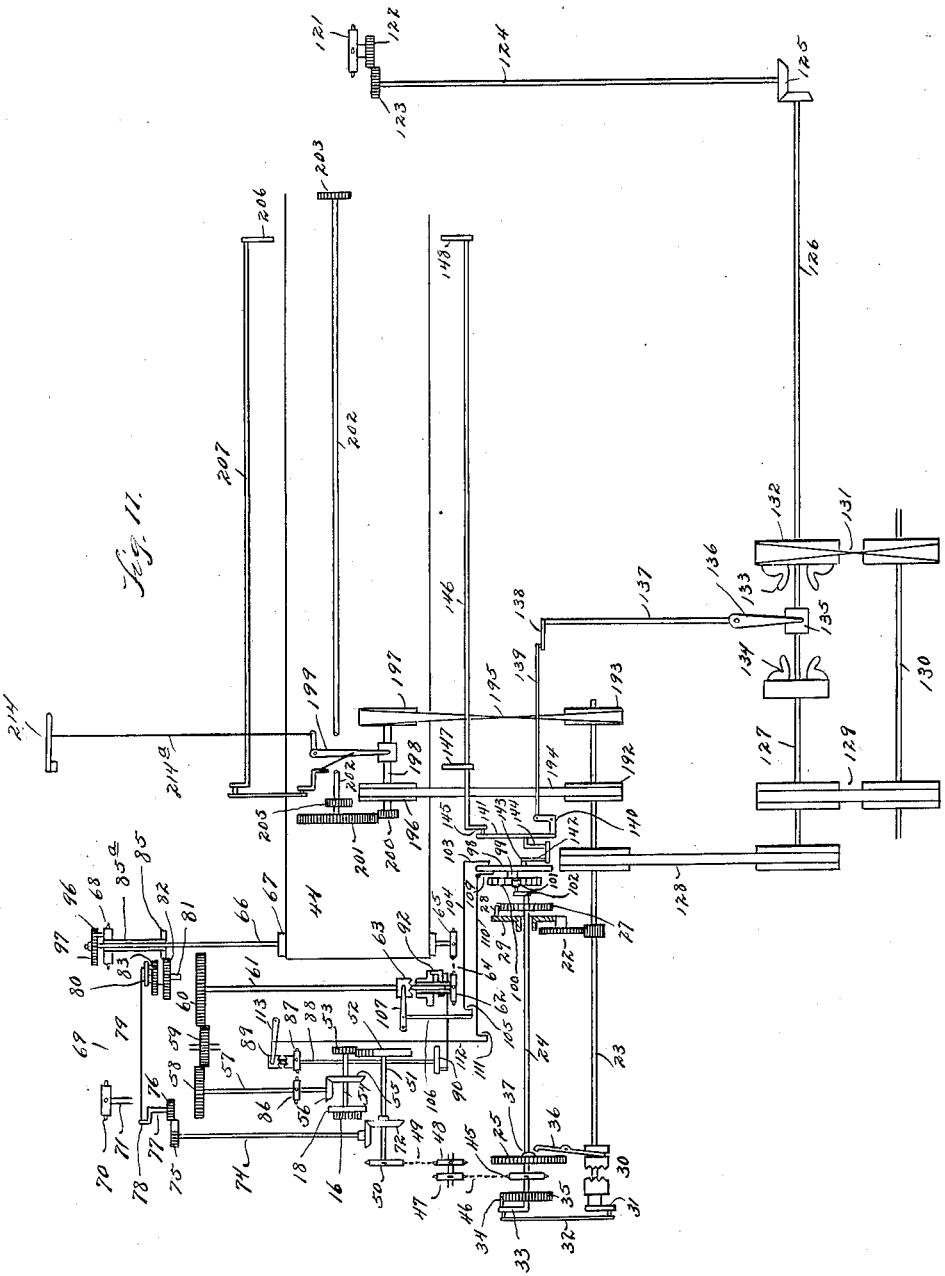

No. 879,852. PATENTED FEB. 25, 1908.
A. W. COPLAND.
DOUGH FEEDING DEVICE.
APPLICATION FILED JAN. 31, 1902.
7 SHEETS—SHEET 7.
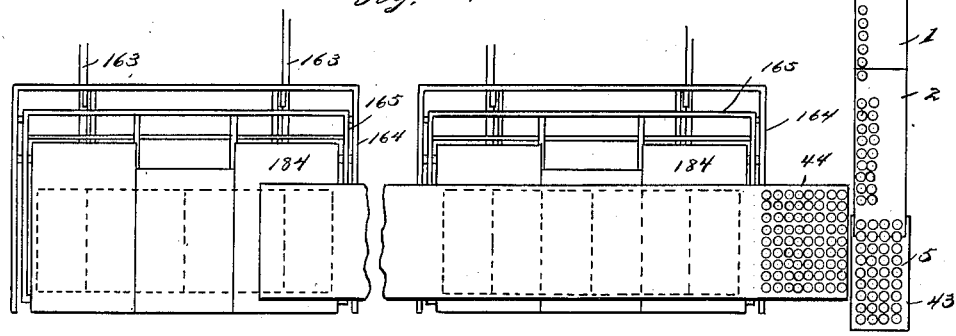
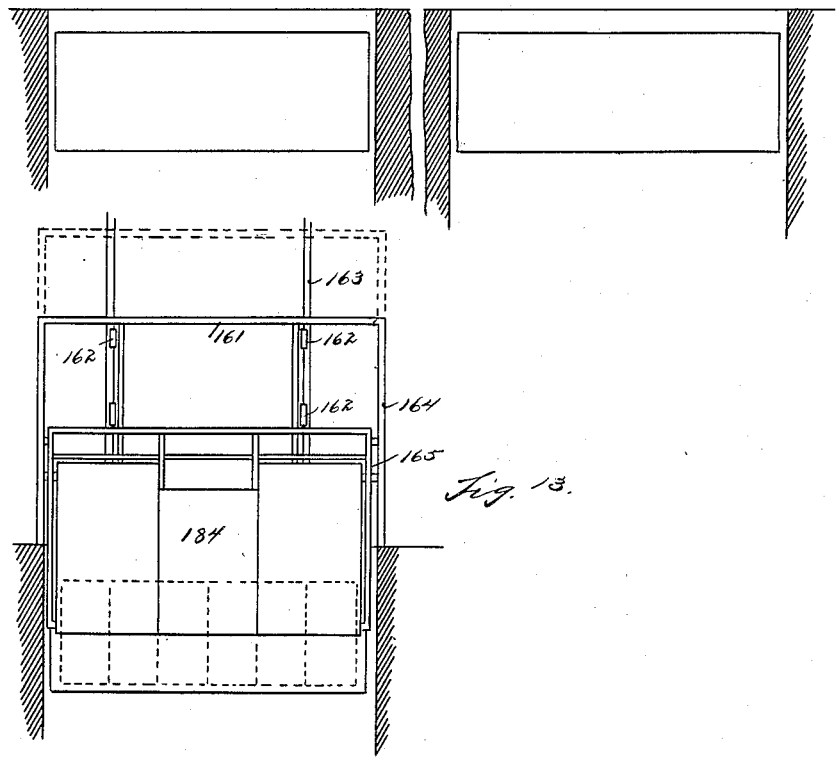
WITNESSES
INVENTOR
Alexander W. Copland
By Thos. K. Pragnet Son
Attorneys.

UNITED STATES PATENT OFFICE.

ALEXANDER W. COPLAND, OF DETROIT, MICHIGAN.

DOUGH-FEEDING DEVICE.

No. 879,852.

Specification of Letters Patent.

Patented Feb. 25, 1908.

Application filed January 31, 1902. Serial No. 92,006.

*To all whom it may concern:*

Be it known that I, ALEXANDER W. COPLAND, residing at Detroit, in the county of Wayne and State of Michigan, a citizen of the United States, have invented certain new and useful Improvements in Dough-Feeding Devices, of which the following is a specification, reference being had therein to the accompanying drawings.

The invention relates to improvements in dough feeding devices, and the particular application herein shown illustrates means for feeding dough from a cracker or cake cutter to the oven.

The invention consists in a device for feeding the cut dough strip intermittently into an oven, which, so far as I am aware, has heretofore been done entirely by hand. Combined with the oven feeding mechanism is means for feeding the dough strip to the oven feed.

So far as I am aware, I am the first to devise mechanism which will take the product from a continuously operating cutter (whether reciprocating or rotary) and feed it intermittently into an oven.

The invention also consists in the various parts of the dough feed mechanism including so called "stripper"; transfer mechanism for feeding the dough transversely to its original line of movement, and in the various combinations of devices and mechanisms pointed out in the claims.

In the drawings, Figure 1 is a plan view of the mechanism. Fig. 2 is a longitudinal section partly in elevation. Fig. 3 is an enlarged section of a portion of Fig. 2. Fig. 4 is a section substantially on line x—x, Fig. 2, showing the oven partly broken away and the oven feed in section and as projected into the oven. Fig. 5 is an enlarged detail of a portion of Fig. 4. Fig. 6 is a rear elevation of a portion of the mechanism. Fig. 7 is an end elevation of a portion of Fig. 6. Fig. 8 is an end elevation similar to Fig. 7 partly in section. Fig. 9 is a perspective view of a portion of the oven feeding mechanism. Fig. 10 is a horizontal section, illustrating the traveling intermeshing gears shown in Fig. 9. Fig. 11 is a diagram view illustrating the complete drive train for all of the various mechanisms of the machine. Fig. 12 is a diagrammatic plan view showing the devices as arranged for feeding to adjacent ovens. Fig. 13 is a similar plan showing the oven feeding device in the act of depositing a charge in the oven. Fig. 14 shows an enlarged detail of Fig. 6.

The machine comprises, feed devices to the oven feed, and the oven feed. In the machine in which my invention is herein illustrated, the feed devices to the oven feed comprises a feed from the cutter, a transfer mechanism upon which the cut dough is "stripped" or "peeled" in sections and which transfers sections at an angle to the original line of movement upon a stripper which strips or peels the sections upon the oven feed. This stripper I call the charge stripper, as it delivers a charge upon the oven feed. The oven feed I also show in the form of a stripper or "peeler" reciprocating into and out of the oven, and delivering its charge therein, intermittently, leaving time between the charging for withdrawing the baked charge from the oven shelf. The oven feed is also shown as co-acting with mechanism for shifting the oven to present a new shelf at each operation.

In describing the machine I will begin with the devices immediately adjacent to the cutting machine, not shown, and trace the mechanisms successively to the oven feed.

1 is a portion of the conveyer or feeding belt leading from a cutter not shown and upon which the cut dough from the cutter is continuously fed.

2 is a carrier for receiving the cut product from the conveyer 1 and for delivering sections of the same upon the transfer carrier. The carrier 2 is in the form of an endless belt passing around a roll 3, adjacent to the end of the carrier 1, and extending from this roll over the frame 4 and above the transfer 5. 6 is a thin plate or bar having a rounded edge and forming a support around which the belt 2 passes. This bar forms a portion of the stripping mechanism and is connected to bearings 7 which are slidingly mounted upon guides 8 arranged upon opposite sides of the belt and extending longitudinally thereof. The belt 2 after passing around the bar 6 returns substantially parallel to its upper portion to a point beyond the forward edge of the transfer carrier and then passes around idler rolls 9 and 10 and a drive roll 11. It then passes around an idler 12 from which it extends to the roll 3. The roll 10 is arranged to form a loop in the belt between the rolls 9 and 11 and is adapted to be drawn downward to take up the slack in the belt during the operation of stripping. This stripping occurs whenever the portion of the belt immediately above the transfer carrier is filled with a section of the product which is to be deposited on the transfer. To effect the stripping the bar 6 and idler 10 are caused to move simultaneously, the former in the reverse direction to the feed of the belt and the latter downward to take up the slack. As their distance of travel is precisely the same they are preferably connected to a common actuating mechanism, comprising a chain or other flexible connection 13, passing around a sprocket 14, the one end thereof being connected with the bearings supporting the bar 6 and the other with a yoke connecting to the roll 10.

With the parts above described it will be understood that motion being imparted to the belt 2 from the drive roll 11 it will be caused to travel in the direction indicated by the arrow at a speed preferably substantially the same as that of the carrier 1, so as to receive the cut product from said carrier and to convey it over the transfer carrier, after which the stripping mechanism will be thrown into operation and will cause the belt 2 to be withdrawn from beneath the product so that the latter will drop upon the transfer.

As the delivery belt 1 is continuous in operation, it is necessary that the belt 2 be also continuously fed forward that it may constantly receive the product from the belt 1. Thus the belt 2 will continue to feed forward during the operation of stripping and in order that this may not result in the crowding or the piling one upon the other of the succeeding crackers or cakes, the transfer carrier is preferably also fed in the same direction and at the same speed as the belt 2 during the stripping. This is accomplished by mounting the transfer upon a movable frame 15 which is connected with suitable actuating mechanism for intermittently reciprocating it timed to move forward synchronously with the rearward movement of the stripper bar 6. Any suitable mechanism is employed for this purpose, but that shown in the drawing comprises an intermittently actuated pinion 16 and a rectangular frame 17 embracing said pinion. This frame is provided with rack sections upon its inner faces with one of which said pinion is in mesh, and adjacent to the pinion is a cam 18 upon the pinion shaft for raising or lowering said frame to alternately throw the pinion in mesh with the racks on opposite sides thereof. The frame 17 is thus caused to reciprocate and by means of connecting links 19 its movement is imparted to the frame 15. The stripping mechanism is also preferably actuated through the same reciprocating drive mechanism and to this end the frame 15 is provided with a forwardly projecting rack 20 which engages with a pinion 21 upon the shaft of the sprocket 14. Thus, whenever the pinion 16 is rotated a reciprocating movement is imparted to the frames 17 and 15, which in turn actuate the transfer carrier and the stripper as before described.

During each cycle of movement the belt 2 is moved for a sufficient distance to receive a section of the product of the required length. As the total length of the upper portion of the belt 2 is considerably greater than the length of one section, it is evident that more than one section will be upon the belt at the same time. In order that these sections may be kept neatly separated from each other during the operation of stripping it is advisable to provide a periodic acceleration in the speed of the belt 2, or what I shall call a skip, which causes a gap or space between succeeding sections. This is effected by providing the roll 11 with two drive connections, one of which drives it continuously at normal speed and the other at intervals throws it forward at faster speed. As shown, this mechanism comprises a gear train 22, receiving its movement from a shaft 23, which is continuously driven at uniform speed and transmits a much slower movement to a shaft 24, the latter being directly connected by the gears 25 and 26 with the roll 11. The gear train 22 includes a ratchet wheel 27, preferably upon the shaft 24, and a pawl 28 engaging therewith, which latter is preferably secured to a gear 29 loosely sleeved upon the shaft 24. Thus the shaft 24 while driven positively and continuously from the shaft 23 is nevertheless capable of being moved ahead of its drive train to permit of the skip movement. This skip is caused by a second drive connection also actuated by the shaft 23 and comprising a clutch 30 on said shaft, a crank 31 sleeved upon said shaft and adapted to be connected thereto by said clutch, a pitman 32 connected to said crank, a rock arm 33 loose upon the shaft 24 and connected to the opposite end of said pitman and a pawl 34 carried by said rock arm engaging a ratchet wheel 35 fixed upon the shaft 24. The clutch 30 is controlled by a lever 36 engaging with the movable member on the clutch and the opposite end of said lever extends into the path of a cam 37 upon the gear wheel 25, the arrangement being such that whenever in the rotation of the shaft 24 the cam 37 is caused to actuate the lever 36 the latter will cause the coupling of the clutch, which through the mechanism just described will drive the shaft 24 for a limited distance at a faster speed than that imparted by the train 22. In order that the amount of the skip movement may be accurately determined, the disengagement of the clutch is effected by cams 38 and 39 respectively upon the movable member of said clutch and upon the stationary bearing, said cams being arranged to hold the clutch in engagement during one complete revolution of the shaft 23 and then to permit of their disengagement by a spring 40.

The transfer 5 comprises an endless belt carrier which passes around a drive roll 41 and a thin bar 42 to form a horizontal section 43 on which the product is deposited from the stripper. The direction of feed of the transfer belt is preferably at right angles to the belt 2, so that the section delivered thereon is fed transversely. The object of this construction is to permit of arranging a charge for the oven which is of greater width than the width of the cutter which delivers the product to the belt 2.

The feed of the transfer belt is intermittent and only occurs during the intervals in which the stripper mechanism is stationary. During this interval a sufficient movement is made to deliver the section deposited on the transfer onto an adjacent carrier belt or what has been heretofore termed a charge stripper 44, as it is adapted to peel or strip the charge thereon to deposit it upon the oven feed.

The mechanism for driving the transfer carrier and the charge stripper carrier is so timed that the latter is always actuated during a movement of the former, but the charge carrier is adapted to be periodically moved or skipped at an accelerated speed. This is for the purpose of separating one charge from a succeeding one and also to permit of making a gap between succeeding charges equal to the space between two ovens where more than one oven is fed by the same charge carrier.

The drive mechanism for the transfer and charge carriers includes the drive mechanism heretofore described as far as the shaft 24. Upon this shaft is mounted a sprocket wheel 45 which is connected by the chain 46 with an intermediate sprocket 47.

48 is a sprocket on the shaft of the sprocket 47 which is connected by a chain 49 with a sprocket 50 on a shaft 51.

52 is an interrupted gear upon the shaft 51 which intermittently meshes with a gear 53 upon a parallel shaft 54. The latter has mounted thereon the pinion 16 and cam 18 heretofore referred to, as causing the intermittent actuation of the section stripper.

55 is a bevel gear upon the shaft 54 meshing with a bevel gear 56 on a shaft 57. The latter is connected through a gear train comprising the gears 58, 59 and 60 with a shaft 61 parallel to the shaft 57.

62 is a sprocket wheel sleeved upon the shaft 61 and adapted to be periodically coupled therewith by a clutch 63. The sprocket wheel 62 is connected by a chain 64 with a sprocket 65 on a shaft 66 and upon the latter is secured a roll 67 constituting the drive for the carrier 44.

68 is a sprocket loosely sleeved upon the shaft 66 and connected by a chain 69 with a sprocket 70 on a shaft 71. The shaft has mounted thereon the roll 41 which constitutes the drive for the transfer carrier 5. As however, this transfer is periodically reciprocated the roll 41 is sleeved upon the shaft 71 and is compelled to rotate therewith by being feathered or otherwise slidingly secured thereto.

In addition to the gear train above described which connects the roll 67 with the drive mechanism, is a second drive train for said roll, comprising the following members: 72 is a bevel gear upon the shaft 51 which meshes with a bevel gear 73 upon the shaft 74 extending parallel to the shaft 57. 75 is an interrupted gear wheel on the shaft 74, and 76 is a pinion for meshing therewith secured to a short shaft 77 having at its outer end a crank 78. This crank is connected by a pitman 79 with a rock arm 80 loosely sleeved upon the shaft 81. 82 is a ratchet wheel upon this shaft adjacent to the rock arm 80 and 83 is a pawl secured to the rock arm and engaging said ratchet. 84 is a gear wheel on the shaft 81 meshing with a pinion 85 connected with the sprocket 68 by the sleeve 85ª loose upon the shaft 66.

The machine is also provided with a third drive train for the roll 67 which receives its movement from the shaft 57 and includes the following members. 86 is a sprocket on the shaft 57 connected by a chain with the sprocket 87 upon a shaft 88 extending parallel to the shaft 57. The sprocket 87 is loosely sleeved upon the shaft 88 and is adapted to be intermittently coupled therewith by a clutch 89. 90 is a crank on the shaft 88 connected by a pitman 91 with the rock arm 92 sleeved upon the shaft 61. This rock arm carries the pawl 93 engaging with the ratchet wheel 94 secured to the sprocket 62.

By tracing the three drive trains as above given it will be observed that the roll 67 is adapted to be driven by any one of the three, but that on account of the clutches and interrupted gears forming members of said trains they are not all operating at the same time. It will be further observed that the train starting with the shaft 51 is capable of movement during the interval of rest of the shaft 54 while the interrupted gear 52 is out of mesh with the pinion 53. This permits of driving the sprocket 68 during the time interval in which the stripper 6 and frame 15 for reciprocating the transfer are at rest. As the sprocket 68 is directly connected by the chain 69 with the sprocket 70 on the shaft 71 and as the roll 41 is driven by the shaft 71 it will be evident that the transfer belt will be driven whenever the said train is in operation. The sprocket 68 has secured thereto an arm 95 which carries the pawl 96 engaging with a ratchet wheel 97 fixed upon the shaft 66. Thus whenever the sprocket 68 is in motion a like movement will be imparted to the shaft 66 through the ratchet and pawl and the shaft 66 will in turn drive the roll 67 which drives the charge carrier.

As it is desired for transfer of material from one to the other to drive the transfer carrier and the charge carrier belts only during the interval of rest of the section stripper it is necessary that a break in the drive should occur whenever the shaft 54 is being driven. This is provided for by the interrupted gear 75 which is so timed and proportioned that whenever the interrupted gear 52 is out of mesh with the gear wheel 53 said interrupted gear 75 will be in mesh with the gear wheel 76. On the other hand when the gear 52 is driving the gear 53 the gear 75 will be out of mesh with the gear 76 so that the sprocket 68 will remain stationary.

The normal driving of the transfer and section carrier belts being provided for by the mechanism above described, the object of the other two drive trains of the shaft 66 is to provide for the two skips of the section carrier belt 44. One of these skips occurs whenever a complete charge has been deposited upon the section carrier belt 44. Such a charge is composed of a plurality of sections which have been successively delivered on the belt 44 from the transfer belt 5. After the required number of sections have been thus delivered the clutch 63 will be thrown into engagement so as to couple the sprocket 62 with the shaft 61. As this shaft 61 is rotated whenever the shaft 54 is in motion it is evident that the charge carrier 44 will be driven through the medium of the train comprising the bevel gear wheels 55 and 56, the shaft 57, the intermeshing gears 58 and 59 and 60, the shaft 61, the clutch 63, the sprocket 62, the chain 64, sprocket 65, shaft 66 and roll 67. The clutch 63 is controlled by a time mechanism which will now be described.

98 is a cam wheel preferably in the form of a disk mounted upon the shaft 99 which also carries a toothed wheel 100. The latter is adapted to be intermittently driven by the pawl 101 which is shown in the form of a roll secured to the crank 102 fixed upon the shaft 24. The disk 98 has formed thereon preferably upon one side a projecting cam which is adapted in the rotation of the disk to actuate the rock arm 103 upon a rock shaft 104. 105 is another rock arm upon the shaft 104 which is connected by a link 106 with a rock arm 107 arranged to actuate the clutch 63. The timing of the mechanism is such that the clutch will be thrown into engagement after a complete charge has been delivered upon the carrier belt 44 so that the belt will be driven forward to leave a space between the charge and the succeeding section.

Where the apparatus is used for feeding a single oven, mechanism similar to that just described is all that is necessary to separate succeeding charges from each other upon the charge carrier, but if the machine is used for feeding two or more ovens it is necessary to provide two independent skip mechanisms, the one described being employed for spacing the charges by a distance equal to that between the two ovens and a second one separating succeeding double charges from each other. As shown this latter skip mechanism comprises the third train previously described which derives its motion from the shaft 57 through the medium of the sprocket wheel 86 thereon. In this train is the clutch 89 which is also preferably actuated by mechanism controlled by the disk 98 and constructed as follows:

108 is a cam preferably upon the periphery of the disk which is adapted to coöperate with a rock arm 109 upon the rock shaft 110. 111 is a rock arm on this shaft connected by a link 112 with a rock arm 113 for actuating the clutch 89. Thus, whenever the cam 108 actuates the arm 109 the clutch 89 will be drawn into engagement which will drive the shaft 88 and through the crank 90 and pitman 91, rock arm 92, pawl 93 and ratchet wheel 94 will actuate the sprocket 62 and cause the forward drive of the belt 44.

It is to be noticed that during both skip movements the transfer belt 5 remains stationary. This is permitted for the reason that the sprocket 68 is loose upon the shaft 66 and the former is driven through the medium of the ratchet and pawl 96 and 97 and this connection will not interfere with the independent movement of the shaft 66.

The charge carrier 44 comprises an endless belt which passes around the drive roll 67 and thence forward horizontally for a sufficient distance to receive the charge or a number of charges according as the machine is designed for one or more ovens. At the forward end of this horizontal portion of the belt is a thin bar 114 around which the belt passes and then returns substantially parallel to the upper portion. Near the rear end of the frame the returning portion of the belt passes around an idler roll 115 thence downward and around an idler 116 to a traveling roll 117. From this roll the belt returns and after passing around an idler 118 and take-up rolls 119, passes to the drive roll 67. The roll 117 is connected with the thin bar 114 by a flexible reciprocatory connection 120 similar to the one described for the section stripper mechanism.

The chain 120 is reciprocated at the proper time by a drive sprocket wheel 121. This wheel is itself driven through the medium of gears 122 and 123 connecting it with a shaft 124 and the latter is connected by miter gear wheels 125 with a shaft 126. The shaft 126 is preferably arranged in alinement with a shaft 127 which constitutes a part of the driving mechanism for the shaft 23, being connected thereto by a straight belt connection 128.

The shaft 127 is constantly driven by a belt connection 129 from a shaft 130, which constitutes the drive shaft for the entire mechanism. This shaft 130 is connected by a cross belt connection 131 by a pulley 132 sleeved upon the shaft 126.

133 is a clutch for coupling the shaft 126 with the pulley 132 and 134 is a second clutch for coupling the shaft 127 with the shaft 126. These clutches are operated alternatively through a common mechanism which mechanism has an intermediate position in which both clutches are out of engagement. This operating mechanism comprises a sleeve 135 having suitable connection with the clutches 133 and 134. These clutches may be of any desired construction and need not be described in detail.

The sleeve 135 is actuated by a rock arm 136. This is actuated by suitable connecting mechanism which is controlled by a third cam on the disk 98 and is of the following construction:

137 is a rock shaft to which the rock arm 136 is secured. 138 is a second rock arm thereon connected by a link 139 with a bell crank lever 140, the opposite arm of which is connected with a vertical bar 141. This bar is adapted to be actuated by a rock arm 142 engaging with a cam lug 143 on the disk 98, preferably arranged upon the opposite side from the lug 99. The rock arm 142 actuates a rock arm 144 which is connected with the vertical bar 141. The upper end of the bar 141 is connected to a rock arm 145 on a rock shaft 146 extending longitudinally to and adjacent to the carrier belt 44. Upon this rock shaft 146 are two trip arms 147 and 148, respectively arranged at the opposite ends of the horizontal portion of the charge carrier belt.

The arrangement of mechanism just described is such that at a certain point in the rotation of the disk 98, the lug 143 will actuate the rock arm 142 and through the rock arm 144, vertical bar 141, bell crank lever 140, link 139, rock arm 138, rock shaft 137 and rock arm 136 will move the sleeve 135 so as to throw into engagement the clutch 134. This will couple the shaft 126 with the shaft 127 and through the bevel gears 125, shaft 124, gears 123 and 122 will drive the sprocket 121. The movement of the sprocket 121 will cause the feeding of the chain 120, which will simultaneously actuate the traveling roll 117 and the thin bars 114 to cause the stripping of the charge on the belt 44. The bar 114 is connected to a frame 149 which travels upon longitudinal ways 150 mounted on the framework of the machine.

As the horizontal portion of the belt 44 which carries the charge or charges is necessarily of considerable length it is desirable to provide supports therefor which will prevent sagging. At the same time it is necessary to withdraw the supports whenever the operation of stripping takes place, in order not to interfere with the movement of the bar 114. The supporting means shown consists of belts 151 and 152 respectively arranged below the upper and lower portions of the belt 44 and connected at their forward ends to the traveling frame 149. These belts pass over idlers 153 and 154 and downward from the belt 44, thence around idlers 145 and 146 and are connected to the traveling frame in which the roll 117 is journaled. This frame 157 is adapted to travel upon guides 158 on the frame work of the machine. The belts 151 and 152 are provided with a series of cross-bars 159 which extend across beneath the belt 44 and slidingly engage with ways 150 and also ways 160 secured adjacent to the ways 150 for the traveling frame 149. These bars serve to support the sections of the belt 44 so as to prevent any sagging therein. At the same time as the belts 151 and 152 are connected at opposite ends thereof to the frames 149 and 157, it is evident that these belts, together with their cross bars will be withdrawn whenever the bar 114 is drawn back during the operation of stripping.

Near the end of the rearward movement of the frame 149, the trip 147 will be actuated thereby which will cause the rocking of the shaft 146 and arm 145 thereon thereby actuating the vertical bar 141. The latter through the intermediate connections previously described will move the sleeve 135 so as to disengage the clutch 133 and throw into engagement the clutch 134. This will couple the shaft 126 with the shaft 127 and drive the former in the reverse direction from its previous operation, so that the movement of the sprocket 120 will be likewise reversed. Thus the frame 149 and bar 114 will be moved forward again until they reach their normal positions.

Just before reaching its forward position the frame 149 will actuate the trip 148 to rock the shaft 146 again, the amount and direction of movement being such that the sleeve 135 will be thrown into its central position. Both clutches 133 and 134 will thus be disconnected from the shaft 126 so that the latter will remain stationary until another charge has been accumulated upon the carrier and is ready to be stripped.

The oven feed is in the form of a reciprocating carrier which is provided with stripping or peeling mechanism by which the products once delivered into the oven is deposited upon the shelf therein. As shown, this carrier comprises a carriage frame 161 supported upon wheels 162, the latter being adapted to travel upon a track 163. This track is of sufficient length to reciprocate the carriage from a position in which the apron for holding the product is directly beneath the charge carrier belt to a position where said apron is adjacent to the oven.

Upon the frame 161 are arranged guides 164 upon which is mounted a traveling frame 165. The latter is pivotally connected to blocks 166 which are adapted to travel in ways formed in the guides 164. The frame 165 has journaled therein the shafts 167 and 168, the former constituting the pivot for connecting the frame 165 to the blocks 166. This shaft passes through bearings in said blocks and has secured thereon pinions 169 adapted to mesh with racks 170 secured to the guides 164. Adjacent to the pinion 169 at one end of the shaft 167 is a bevel gear 171 adapted to mesh with a bevel gear 172 sleeved upon a shaft 173. This shaft is journaled in bearings 174 secured to the guides 164. The bevel gear 172 is journaled in a bracket 175 secured to the block 166 and said bevel gear is also feathered to the shaft 173 so as to be compelled to rotate therewith, but is free to slide longitudinally thereon. 176 is a bevel gear wheel at the end of the shaft 173 which meshes with a bevel gear wheel 177 on a short shaft 178. The latter is journaled in bearings on the guide 164 and a bracket 179 secured thereto. 180 is a pinion secured to the shaft 178.

The arrangement of the parts just described is such that whenever the pinion 180 is rotated its movement will be transmitted through the shaft 178, bevel gear wheels 177 and 176 to the shaft 173, and from the latter to the bevel gear 172 which rotates the bevel gear 171, shaft 167 and pinions 169 thereon. As these pinions engage with the racks 170 it is evident that the blocks 166 and pivoted frame 165 will be caused to travel along the guides 164. The direction of travel will depend upon the direction of rotation of the pinion 180.

The frame 165 is of a width sufficient to receive an entire charge for the oven and is adapted to be periodically projected into the oven by the mechanism just described. Upon this frame is mounted the apron or peel 184, which is adapted to receive the product from the charge stripper 44. This apron is preferably formed in three or more sections arranged adjacent to each other, two of the sections passing around rolls 181 on the shaft 168 and the central section passing around a roll 182 on a shaft 183 parallel to the shaft 168. The apron 184 is endless and passes from the drive roll 182 or 181 to a thin bar 185 constituting a portion of the frame 165. Suitable tightener rolls, such as 186 and 187 are also provided for holding the apron taut. The shafts 167 and 168 are connected by intermeshing gears 188 and 189 and a ratchet and pawl connection 190, 191, by means of which the movement of the shaft 167 in one direction will impart a similar movement to the shaft 168, but when rotated in the opposite direction the ratchet and pawl connection will permit the shaft 168 to remain stationary.

The carriage 161 is reciprocated upon its track 163 by means of the following mechanism: 192 and 193 are pulleys upon the shaft 23 which are connected respectively by straight and cross belts 194 and 195 with pulleys 196 and 197 upon a shaft 198 arranged beneath the frame 161. These pulleys 196 and 197 are adapted to be alternatively coupled to the shaft 198 by clutches similar in construction to those upon the shaft 127 and operated by a lever or rock arm 199. The arrangement is such that in the central position of said rock arm 199 both clutches are disconnected, so that the pulleys 196 and 197 are loose upon the shaft 198, while the movement upon opposite sides of said central position of the lever 199 will respectively couple said pulleys to the shaft. The shaft 198 has secured thereon a pinion 200 which meshes with a gear wheel 201 upon a shaft 202 extending completely across beneath the traveling carriage 161. 203 are pinions upon this shaft meshing with the racks 204 secured to the guides 164. 205 is a gear secured to the shaft 202 which is arranged in the same vertical plane as the gear wheel 180 and is adapted in one position of the carriage to be thrown into mesh with said gear wheel. The arrangement of this mechanism is such that when the lever 199 is thrown to one side of its central position the pulley 196 will be coupled to the shaft 198 as before described which will transmit rotary motion from the shaft 23 to the pinion 200. This through the medium of the gear wheel 201, shafts 202 and pinions 203 thereon will cause the latter to propel the racks 204 and cause the carriage to travel along its track 163 until the forward edge of the guides 164 come in contact with the wall of the oven or in close proximity thereto. For starting the movement of the carriage a trip 206 is arranged in the path of the traveling frame 149 of the stripping mechanism for the charge carrier so that after the operation of its stripping a charge has been completed and the frame 149 in returning to its normal position will operate the trip 206. This trip actuates a rock shaft 207 which is connected by a rock arm 208 to a vertical rod 209 and the latter is connected through a rock arm 210, rock shaft 211, rock arm 212 and link 213 to the arm or lever 199. Thus the operation of the trip 206 will cause the throwing of the lever 199 so as to cause the starting of the carriage in its travel towards the oven.

The movement of the carriage is arrested by the disengagement of the pinions 203 with the ends of the racks 204 and the parts are so proportioned that just as the pinions 203 are freed from said racks the gear wheel 205 will come into mesh with the gear wheel 180. Thus after the carriage has come to rest rotary motion will still be transmitted through the shaft 198 and drive train connected therewith to the gear wheel 180 and from the latter through the train previously described to the pinions 169. These will travel along the racks 170 and carry the frame 165, together with the peel apron mounted thereon and also the charge which has been previously deposited on said apron by the charge stripper into the oven and above the shelf on which the charge is to be deposited. This shelf is preferably connected with the rotary oven carrier, but as this forms no part of the present invention a description of its mechanism is unnecessary.

When the peel apron has completed its inward movement a trip such as 214 is actuated, which through suitable connecting mechanism 214ª causes a reversal of the lever 199 so as to disconnect the pulley 196 from the shaft 198 and connect the pulley 197 thereto. As the latter is driven in the reverse direction through its cross belt drive connection 195 the result will be that the entire train actuated by the shaft 198 will be moved in the reverse direction. This will first cause the pinions 169 to travel back upon the racks 170, withdrawing the frame 165 from the oven and after this frame 165 is completely withdrawn the pinions 203 will again be thrown in mesh with the racks 204 which will cause the carriage to travel back upon its track to its initial position.

During the withdrawal of the frame 165 from the oven the peel apron 184 must be driven forward at the same speed as the frame 165 is moved backward, in order that the charge may be stripped or peeled upon the shelf of the oven. This movement of the apron is accomplished by the connection between the shafts 167 and 168 comprising the gear wheels 188, 189, pawl 191 and ratchet wheel 190, and as the direction of movement is such that the pawl engages with the ratchet the shaft 168 will be rotated. Upon this shaft of the rolls 181 are two sections of the apron while the roll 182 for the intermediate section is also driven through a shaft 183 by connecting gearing between said shaft and the shaft 168.

As before stated the frame 165 is pivotally connected to the traveling blocks 166. This is for the purpose of permitting said frame to be tilted, so that during its inward movement towards the oven the peel apron is held in a horizontal position and after said apron has nearly completed its inward movement it will be dropped downward into an inclined position where its forward end is in close proximity to the oven shelf. This position will be maintained during the withdrawal of the apron from the oven and until it has nearly reached its normal position, whereupon it will be again tilted into a horizontal position. For causing this tilting movement the frame 165 has projecting therefrom at opposite sides the lugs or rolls 215, which are adapted to travel in ways formed upon the guides 164. These ways have arranged at opposite ends hinged sections, such as 216 and 217 and also an inclined portion 219, by means of which the frame 165 is tilted from its horizontal to its inclined position in the forward movement of the carriage and is righted again at the end of the rearward movement.

I preferably provide adjustments for changing the amount of the various skip movements so that the dough sections may be accurately registered with the transfer, and the dough charges with the oven feed. To this end the throw of the cranks 31 and 90 is made variable by providing them with adjustable crank pins, and the gearing intermediate the shafts 57 and 61 is made variable by making one of the gears a change gear.

What I claim as my invention is:

1. The combination with a continuous feeding mechanism for cut dough, of mechanism for automatically separating sections of the cut dough therefrom and conveying it to a section stripper for feeding it to a transversely moving charge stripper, said section and charge strippers, and an oven stripper to which the sections are fed from the charge stripper.

2. The combination with a continuous feeding mechanism for cut dough, of mechanism for automatically separating sections of the cut dough therefrom and delivering the same to a section stripper, said section stripper, a cross feed belt to which the section stripper belt delivers the sections, a charge stripper to which the cross feed belt delivers the sections, and an oven stripper to which the charge stripper delivers the sections.

3. The combination of a belt stripper, a conveying belt beneath the same, means for intermittenly reciprocating said conveyer synchronously with the discharge of the stripper thereon, and means for actuating the conveyer belt to feed the charge therefrom.

4. The combination with a feeding belt for cut dough, a skip movement belt feeding therefrom, a stripper therefrom, a cross feed belt, said stripper and cross belt having a synchronous movement with the skip movement of the feed belt.

5. A stripper comprising a looped belt, a movable loop bar on which the forward end of the loop is supported, and a movable support for the intermediate portion of the loop.

6. A stripper comprising a looped belt, a reciprocating loop bar on which the forward end of the loop is supported, a movable support for the intermediate portion of the looped belt, a slack take-up for controlling the slack in the looped belt, and a synchronously moving take up for the support.

7. A charge stripper comprising a looped belt, a reciprocating loop bar on which the forward end of the loop is supported, a transversely rigid but longitudinally flexible support for the loop of the belt, a slack controller for the looped belt, and a common actuating device for the slack controller and flexible support.

8. A charge stripper comprising a looped belt, a reciprocating loop bar on which the forward end of the loop is supported, transversely rigid but longitudinally flexible supports for both webs of the loop each moving in guides beneath its supported web, a slack controller for the looped belt, and a common actuating device for the slack controller and the flexible supports for the loop webs.

9. The combination of a charge carrier, means for delivering cut dough sections transversely thereon, and a reciprocating oven feed device for receiving the cut dough sections from the charge carrier and delivering the same into an oven.

10. A traveling feed carrier, a charge carrier moving at an angle thereto, mechanism for transferring the cut dough strip from the feed carrier to the charge carrier, an oven carrier, and mechanism for delivering the cut dough from the charge carrier to the oven carrier.

11. The combination with an oven carrier, of a delivery carrier of lesser width than the oven carrier directed toward said oven and means for transferring the sections of the dough from said delivery carrier and delivering the same to the oven carrier, rearranged to have the longitudinal dimension of the section arranged transversely of the oven carrier.

In testimony whereof I affix my signature in presence of two witnesses.

ALEXANDER W. COPLAND.

Witnesses:
   M. B. O. DOGHERTY,
   H. C. SMITH.